June 27, 1967 L. L. MEYER 3,327,568
DRILL SHARPENING DEVICE
Filed Sept. 8, 1964 4 Sheets-Sheet 4
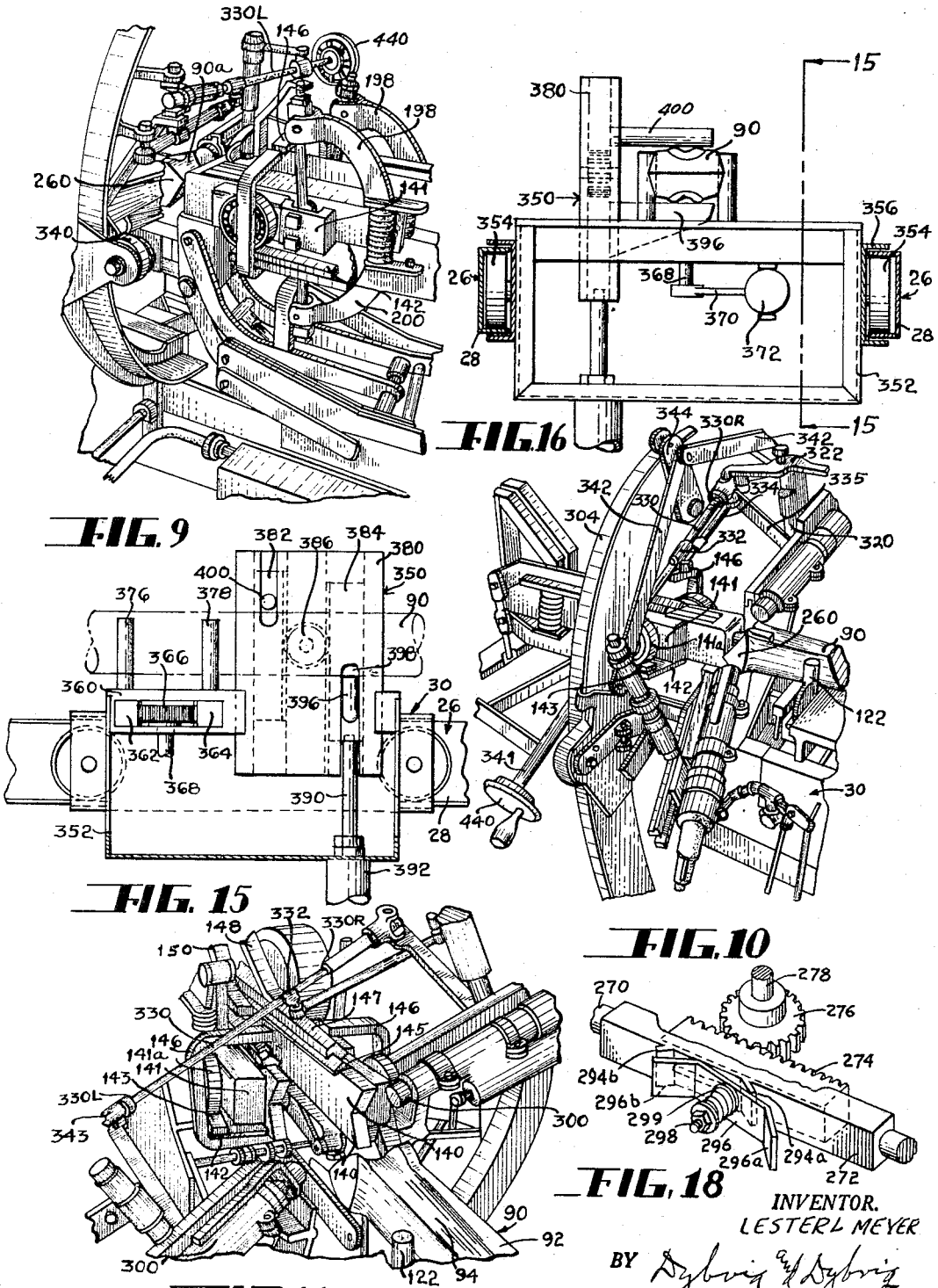
INVENTOR.
LESTER L. MEYER
BY Dybvig & Dybvig
HIS ATTORNEYS

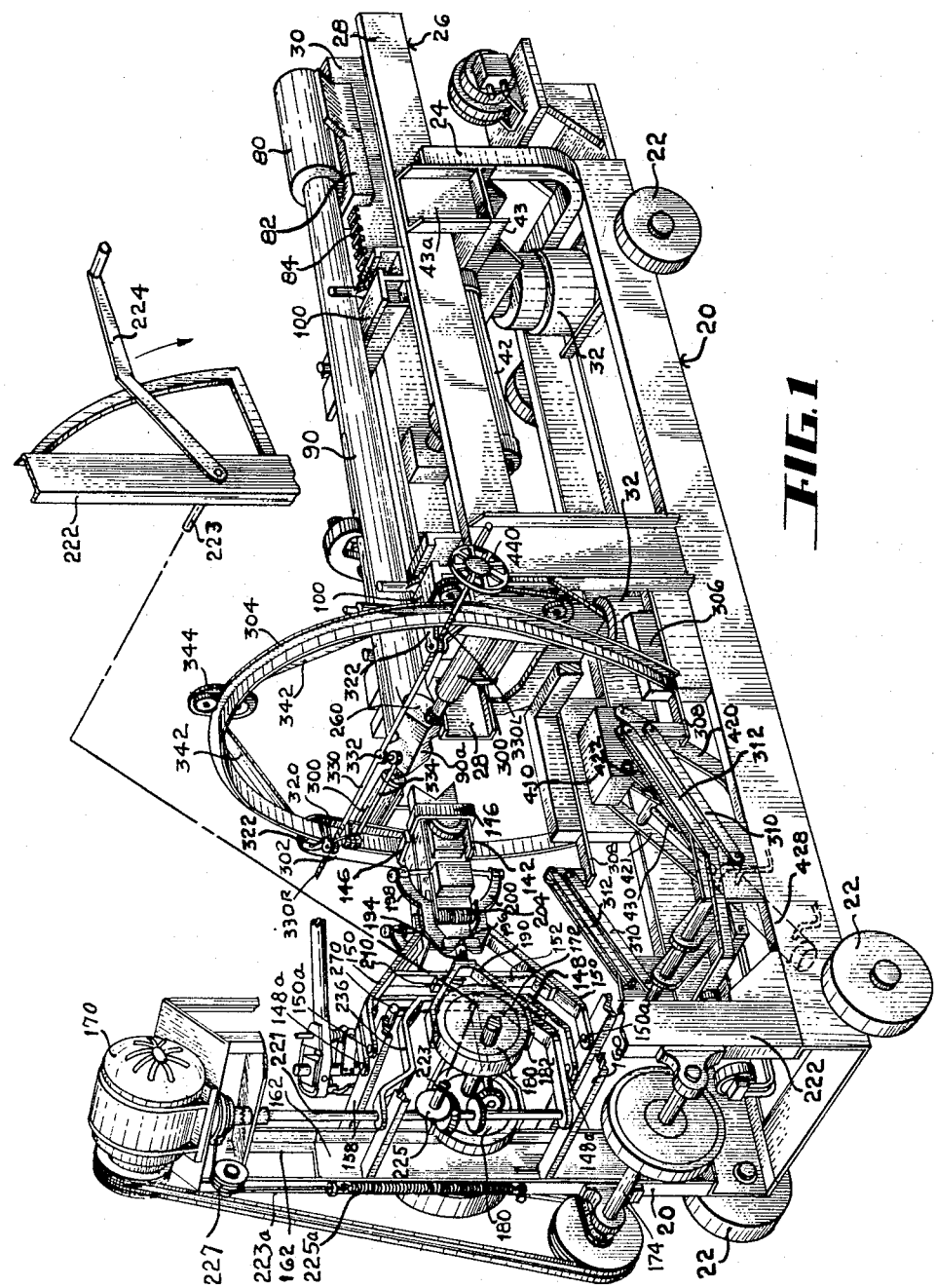

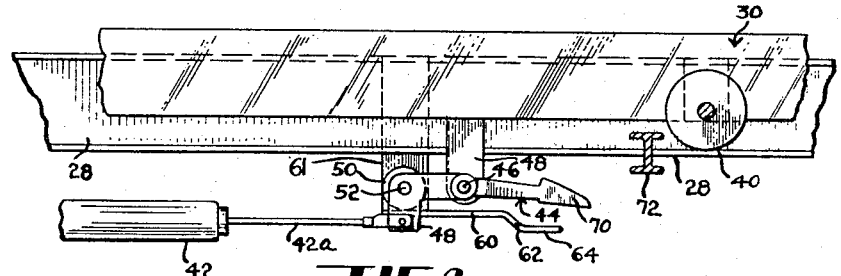

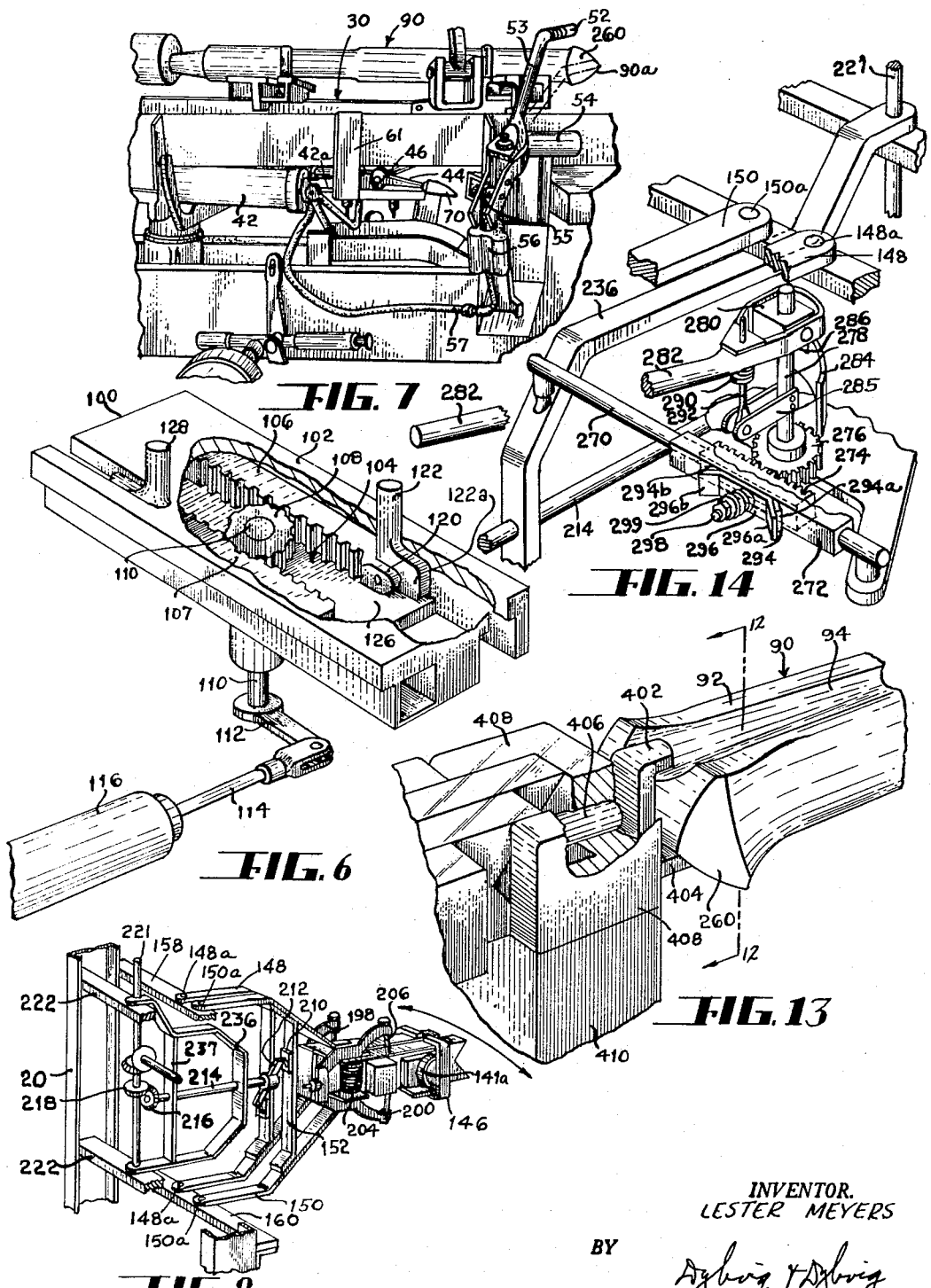

United States Patent Office 3,327,568
Patented June 27, 1967

3,327,568
DRILL SHARPENING DEVICE
Lester L. Meyer, Arcanum, Ohio, assignor to Henry G.
Dybvig, Kettering, Ohio
Filed Sept. 8, 1964, Ser. No. 394,914
5 Claims. (Cl. 76—89.2)

This invention pertains to a machine for upsetting and shaping metal and more particularly to a machine for sharpening drills used in quarries, well drilling, et cetera, although not necessarily so limited.

In drilling holes in quarries and drilling wells, a drill is used that has a sharpened point, the width of the cutting edge being greater than the diameter of the drill, the cutting edge being subtended by frustum-conical portions tapering down to the diameter of the main body of the drill.

An object of this invention is to provide a machine for sharpening the cutting edge of a drill. This has been accomplished by the use of a plurality of hammers, two of which are mounted for reciprocatory movement substantially parallel to the longitudinal axis of the main body of the drill, another pair of hammers supported by a pair of carriages mounted for rotary adjustment on a circular track. These hammers being adjustable and operating in substantially diametrical paths form an angle with respect to the longitudinal axis of the drill for shaping the bevelled portions adjacent the cutting edge.

Another object of this invention is to position the drill in proper relation with respect to the various operating members. This has been accomplished by mounting the drill on supporting mechanism such that a relative movement between the operating members and the supporting mechanism is made so as to obtain the proper relative position of the drill and the operating members.

Other objects and advantages reside in the construction of parts, the combination thereof, the method of manufacture and the mode of operation, as will become more apparent from the following description.

In the drawings:

FIGURE 1 is a perspective view of the machine with parts broken away.

FIGURE 2 is a fragmentary enlarged view of a portion of the mechanism forming a carriage for supporting the drill.

FIGURE 3 is a view similar to FIGURE 2, disclosing a portion of the carriage moved forward and locked in position.

FIGURE 4 is a fragmentary cross sectional view of the carriage and the main frame with the drill shown in section.

FIGURE 5 is a view similar to FIGURE 4, showing a clamp used in clamping the drill in position.

FIGURE 6 discloses a mechanism used in centering the drill in readiness for sharpening.

FIGURE 7 is a fragmentary view showing the drill in position and an indicant for registry with the point of the drill.

FIGURE 8 is a perspective view of the hammers for shaping the point or cutting edge of the drill, with parts broken away for clearness.

FIGURE 9 is a perspective view with parts broken away disclosing a portion of the driving mechanism for the hammers disclosed in FIGURE 8.

FIGURE 10 is a fragmentary view of a portion of the circular carriage and the hammers for forming the bevelled surface adjacent the cutting edge.

FIGURE 11 is another perspective view disclosing the four hammers used in sharpening the drill.

FIGURE 12 is a cross sectional view of the drill, taken substantially on the section line 12—12 of FIGURE 13.

FIGURE 13 discloses the end of the drill and die structure for opening the channel found in the flattened margin of the drill.

FIGURE 14 is an enlarged detailed view of the mechanism for actuating the hammers in unison across the cutting edge.

FIGURE 15 is a view of a modified form of a support for the drill taken substantially on the section line 15—15 of FIGURE 16.

FIGURE 16 discloses one unit of the modified form of a support for one portion of the drill, with parts shown in cross section.

FIGURE 17 discloses a fragmentary side elevational view with parts broken away to show a part of the driving mechanism for the hammers.

FIGURE 18 discloses a fragmentary perspective view of the shoe member 296 disclosed in FIGURE 14.

The machine for sharpening the cutting edge of drills consists of a main frame that may be mounted on wheels. This main frame has mounted thereon an adjustable bed or support upon which the drill rests while being sharpened. This support is adjustable both vertically and longitudinally. A tail stock or end support for the drill is adjustably mounted on the bed, so as to accommodate drills of various lengths. The length of the drills may vary from a couple of feet when worn to 8 or 10 feet or more when new. Each time a drill is sharpened it is shortened. A new drill, especially a drill 8 to 10 inches in diameter, may weigh over 1000 pounds. The cutting end is heated to a high temperature in a forge or a furnace. As is well known in the industry, the heavier drills are moved to and from the forge or the furnace to a drill sharpening position by a suitable hoist mechanism or a crane. Furthermore, the bed is provided with adjustable means for both centering and aligning the drill. A pair of reciprocatory hammers extend substantially parallel to the longitudinal axis of the drill. These hammers face the cutting edge of the drill. These hammers are driven in phase opposition so that the inertia of one hammer counteracts the inertia of the other hammer, thereby neutralizing each other and thereby reducing vibration. A second pair of hammers are mounted for orbital adjustment about the longitudinal axis of the drill and for adjustment of angle of inclination for shaping the frustum-conical surface adjacent the cutting edge of the drill.

Referring to the drawings, a main frame 20 is supported upon four wheels 22, so that the machine may be moved from one place to another. Drill mounting means are mounted on the frame for both vertical and longitudinal adjustments. This drill mounting means includes an inverted U-shaped member 24 used in guiding a bed 26 vertically. This bed 26 is provided with a pair of channel members 28 forming tracks for a longitudinally adjustably mounted carriage or drill support 30 consisting of a number of components which will be described more fully later. A pair of hydraulic cylinders or jacks 32 are mounted under the bed 26 to raise and lower the bed as needed. As best seen in FIGURES 2 and 3, the drill support 30 is supported upon wheels 40 engaging the flanges of the channel members 28.

As best seen in FIGURE 7, the carriage or drill support 30 may be adjusted longitudinally with respect to channel members 28. The carriage 30 is moved to the aft position, that is, the position shown in FIGURE 2, before transferring the drill from the forge to the drill sharpening machine. After the drill has been placed upon the carriage, the carriage is then adjusted from the aft position, as shown in FIGURE 2, to the forward position shown in FIGURE 2. This adjustment is made by means of a cylinder 42 fixedly attached to a cross channel member 43 clearly shown in FIGURE 1. The channel member 43 is fixedly attached to the frame member 28. As clearly shown in FIGURES 2 and 3, the cylinder 42 has a piston rod 42a connected to a bell crank latch member 44, pivoted at 46 to a downwardly projecting arm 48 secured to member 30. A roller 50 is pivotally mounted upon a pintle 52. This roller 50 moves along a track 60 provided with an inclined surface 62 and a second horizontal portion 64. As the carriage 30 is driven forward by the piston rod 42a extending from the cylinder 42, the roller 50, upon descending the inclined surface 62, permits the forward end 70 of the bell crank latch member 44 to move upwardly, so as to engage the transversely mounted I-beam 72 fixedly attached to the channel member 28. The arm 61 fixedly attaches member 60 to the channel member 28. Thus, the carriage is locked in position with the drill ready to be sharpened, as will be described later.

As best seen in FIGURE 1, a tail stock 80 is adjustably mounted upon a supporting member 82. This tail stock straddles the ratchet bar 84 and is locked thereto in any adjusted position by means of a pawl, not shown. The ratchet bar 84 is fixedly secured to the carriage 30 and forms a part thereof. The tail stock is adjusted into and engagement with the end of a drill 90 after being properly positioned, as will be described more fully later. This permits the sharpening of drills of varying lengths. A new drill may be quite long, say ten feet and, after being sharpened numerous times, may be only three or four feet in length.

The drill to be sharpened must be positioned so that the longitudinal axis of the drill is parallel to and directly above the longitudinal axis of the bed for supporting the drill. These drills vary in diameter. They may be five, six or seven inches in diameter, or some other size. As best seen in FIGURE 12, the drill 90 has a pair of diametrically disposed flat surfaces 92, each provided with a longitudinal groove 94. A pair of aligning devices 100 are used in centering or aligning the drill. One of these devices is clearly shown in FIGURE 6. It consists of a substantially rectangular frame member 102 having a rectangular opening or cavity 104 housing a pair of oppositely disposed ratchet bars 106 and 107, the teeth of which mesh with a pinion 108 keyed to a shaft 110, the lower end of which supports a crank arm 112 having its outer end pivotally attached to a piston rod 114 extending from the cylinder 116. The ratchet bar 106 is provided with a bifurcated end 120 pivotally supporting a pin 122, normally resting upon the floor 126 of a cavity 104. The ratchet bar 107 has fixedly attached thereto a vertically extending pin 128.

Upon the pinion 108 being rotated in a clockwise direction, as viewed in FIGURE 6, the arm 122a of the pin 120 will drop down into a horizontal position as soon as the extension 122a clears the floor 126. This will permit the drill being sharpened to be pushed along the top of the aligning device 100 until the drill 90 engages the pin 128. By rotating the pinion 108 in a counterclockwise direction, the pin 122 will be raised into a vertical position and the pins 128 and 122 will move towards each other until both pins engage the sides of the drill to be sharpened. In view of the fact that the pins 122 and 128 are equally spaced but on opposite sides of the longitudinal axis of the machine, the drill 90 will be adjusted and clamped in the proper position. The diameter of the drill, as clearly shown in FIGURE 7, may not be uniform. However, the pins 122 and 128 of each of the devices 100 will move together at the same rate of speed and travel the same distance on each of the devices, so that the pins near one end will grip the larger portion of the drill 90 and the pins of the other device will grip both sides of the drill of a different diameter.

An indexing member 52 mounted upon an arm 53 is pivotally mounted on an arm 54 and actuated by a piston rod 55 mounted in a cylindrical member 56 supplied with hydraulic fluid through a conduit 57. It is used when moved from the full line position into a dot-dash position to locate the tip 90a of the drill 90 in proper position. The drill 90 may be placed in its support manually or by a crane. The carriage or drill support 30 is in its rearward or retracted position when positioning the drill thereon. The indexing member 52 may be moved into dotted position, so as to properly position the cutting end of the drill in proper position for the sharpening hammers to be described hereinafter. The tail stock 80 is then positioned against the end of the drill 90. The carriage, when advanced, is locked in position by the latch member 70.

The holding or locking member 101 pivoted at 103 is actuated from the position shown in FIGURE 4 into the position shown in FIGURE 5 to hold the drill 90 in contact with the carriage 30. Locking member 101 is actuated by a hydraulic or pneumatic cylinder 105 shown in FIGURES 4 and 5.

The end of the drill 90, as shown in FIGURES 1, 7, 9, 10 and 11, is substantially V-shaped, that is, the two cutting edges lie in an acute dihedral angle. The mounting for the hammers, as shown in FIGURES 1 and 8, is merely a schematic showing. The detail of the mounting of the hammers is best seen in FIGURE 11. The mounting of one hammer will be described in detail, the two hammers being mounted in identical reversed supports or mountings, one being for the left hand hammer and the other being for the right hand hammer.

Referring to FIGURE 11, the base or plate member 142 underlies the hammer, the hammer reciprocating on this base member. On one side of each hammer 140 is found a weight member 141 that adds to the mass or total weight of the hammer. This weight is located on one side of the hammer so that it tends to create a torque on the hammer. In order to offset this unbalanced condition, a roller bearing wheel 141a rolls on a rail or track member 143. A substantially triangular-shaped capping member 145 is fixedly mounted along the top edge of the hammer 140. This capping member is held in position by a rail 147 that is fixedly mounted in position by U-shaped brackets or cleats 146. The plate member 142 and the rail member 147 are mounted upon brackets 148 and 150, respectively, as shown in FIGURE 1. Members 148 and 150 are pivotally attached to members 158 and 160, respectively. A rainforcing brace 152 spans the brackets 148 and 150 and reinforces the same.

As best seen in FIGURE 1, the driving mechanism for the hammers 140 includes an electric motor 170 mounted upon the standard 162 and is used in driving a pulley 176 keyed to the transverse shaft 174, as clearly shown in FIGURE 17. The end of the shaft 174, which has been broken away in FIGURE 1, carries a V-belt pulley 176 driving a V-belt 177 trained over a V-belt pulley 178 keyed to the end of the transverse shaft 172. A portion of the V-belt pulley 178 has been broken away to clearly show one of the cams 180. A pair of eccentric cams or wheels 180 are keyed to the shaft 172 that can be clearly seen in FIGURES 1 and 8. That is, eccentric cams 180 are 180° out of phase with each other. One of these eccentric cams and its associated parts will now be described.

A circular band 182, used as a cam follower, is mounted on the eccentric cam 180, which cam is rotatably mounted therein. As best seen in FIGURE 1, the ends of a V-shaped bracket 190 are pivotally attached to the bands 182 and the apex of the V-shaped bracket 190 is connected by a link 194 to a cross member 196. This cross member 196 has pivotally attached thereto a pair of arms 198 and 200. A compression spring 204, shown in FIGURE 8, biases the arms 198 and 200 apart at their outer ends. Pivotally mounted links 206 attach the outer ends of the arms 198 and 200 and the inner ends to a block 207 fixedly mounted to one of the hammers 140. Due to the eccentric cams 180 being 180° out of phase, it can readily be seen that as one hammer advances towards the drill, the other hammer is retracted from the drill. These hammers are cyclically driven, so that during one-half cycle one hammer advances towards the drill and the other hammer is withdrawn from the drill. The hammers 140 each have a V-shaped work-engaging surface. When a hammer engages the cutting ends of the drill, its movement is finally arrested. When a hammer arrested by moving into contact with the end of the drill to be sharpened, the compression springs 204 are compressed, in that links 206 being pivotally attached to the hammers will draw the ends of the links 198 and 200 towards each other. As the hammers are driven in phase opposition, the inertia of one hammer moving in one direction will neutralize the inertia of the other hammer. The hammers 140 are driven at a high rate of speed. Although relatively light in weight, the rapidity of the hammers hitting the end of the hot drill rapidly sharpens the drill. Obviously, the drill is heated to a high temperature, so that the metal is easily worked.

It is necessary to move the hammers laterally, so as to cover the entire cutting edge of the drill. Means are provided for moving the hammers apart individually or they may be moved to either side in unison. For example, if one end of the cutting edge has been worn down or broken, it will be necessary to upset the other portions of the drill sufficiently to present a straight cutting edge across the entire drill. The cutting edge should be normal to the longitudinal axis of the drill. The means for adjusting the hammers sidewise will now be described.

As best seen in FIGURES 1 and 8, reinforcing braces or cross members 152 connecting the brackets 148 and 150 have been provided with blocks 210. These small blocks 210 are provided with vertical grooves, each receiving a pin projecting from member 212 carried upon a shaft 214 and rotated by a gear member 216 meshing with a pinion 218 mounted upon a shaft 221.

As best seen in FIGURE 1, a spool is mounted on the shaft 221 and is biased by a cable 223a connected to a spring 225a and passing over a pulley 227. This biasing mechanism holds the two hammers 140 in parallel relation and close together, so that in the event the hammers are spread into the position shown in FIGURE 11 and the lever 224 is released, the hammers will move into diverging relation as shown in FIGURE 1.

The shaft 221 has a pinion 225a keyed thereto and meshing with a pinion 225 keyed to a shaft 223 provided with a handle 224, which handle 224 is manually operable. By moving the handle 224 in a clockwise direction, as shown in FIGURE 1, the supports for the hammers are then spread apart about the pivots 148a and 150a, as clearly seen in FIGURES 1 and 8. When members 148 and 150 are spread apart by oscillating the handle 224 in a clockwise direction, as seen in FIGURE 1, the supports for the hammers diverge from each other and, in view of the fact that the hammers are guided in the supports, the hammers will move away from each other and toward the outer margins of the V-shaped edge 90a of the drill 90. If the cutting end of the drill 90 has been worn uniformly, the sharpening operation will sharpen the cutting edge uniformly across the entire end of the drill. It may be necessary to traverse the hammering operation several times by moving the handle 224 first in a clockwise direction and then in a counter-clockwise direction as many times are necessary to completely sharpen the drill.

In the event the drill to be sharpened has a low area, as for example, the corner may have broken off in use or for some reason been worn to a greater degree than the rest of the drill, it may be necessary to upset the opposite corner of the drill to a greater extent. In other words, the projecting portion of the drill must be upset to such an extent that the cutting edge is uniform throughout the width of the cutting edge of the drill.

In order to accomplish this, the two hammers may be moved to one side in unison. This has been accomplished by adjusting the hammers so that they are parallel to each other, as shown in FIGURE 8. The member 212 holds the two hammers in the same relative position when the shaft 214 is held against rotation. When a hammer 140 engages the work, the movement of the hammer will then be arrested. However, the eccentric cam 180 will continue to rotate even though it has not reached dead center at this time. This has been made possible in that the links 206 may move together compressing the spring 204. This takes place both when the hammer advances towards the work and when the other hammer passes dead center away from the work, so that the springs 204 cushion and absorb the impact of the hammers irrespective of the way in which they move.

It is common practice in the industry when using hammers to provide a resilient mounting for the hammer so that as the hammer hits the metal to be formed, cushioning means are provided between the hammer and the driving mechanism, so as to permit the movement of the hammer to be arrested before the driving mechanism (usually consisting of a cam and a cam follower) reaches dead center. In this case, the arms 198 and 200 have links 206, as clearly shown in FIGURE 8, pivotally connected to the weight members 141 fixedly attached to the side of a hammer, as best shown in FIGURES 8 and 9. As the end of the hammer 144 engages the V-shaped edge 90a of the drill, the movement of the hammer is arrested and the arms 198 and 200 continue the forward movement. When this occurs, the end of each link 206 attached to a weight member 141 stops moving without stopping the outer end of each link pivotally attached to the arms 190 and 200. This will draw the outer ends of the arms 198 and 200 toward each other, thereby compressing the spring 204. This functions as a cushion absorbing the force exerted by the driving mechanism.

It will be noted by an inspection of FIGURES 1 and 8 that the bracket 236 is pivotably mounted on the shaft 221 and the ends of the bracket 236 rest upon the cross bars 222. As best seen in FIGURE 8, the bracket 236 has a transverse bar 237 in which the shaft 214 is also journalled. By holding the two hammers in parallel relation in close contact, as shown in FIGURE 8, by the cable 223a and the tension spring 225a, and by swinging the bracket 236 about the shaft 221, which functions as a pivot, the two hammers may be shifted in unison either to the left or to the right so as to apply the action of the hammers to any desired area across the end of the drill.

The means for shifting the two hammers in unison and laterally has been shown in FIGURE 14 which is a greatly enlarged view. A rod 270 is pivotally attached to the bracket 236 and passes through an aperture provided therefor in member 272 slidably supporting a toothed rack 274. The rod 270 is fixedly attached to one end of the toothed rack 274. A pinion 276 meshes with the teeth of the toothed rack 274 and is used to swing the bracket 236 on the pivot shaft 221 to the right or the left. This is accomplished by providing a shaft 278 keyed to the pinion 276 and having a block 280 keyed thereto.

A bifurcated handle 282 is pivotally attached to the block 280 fixedly mounted on the shaft 278. The handle 282 is normally locked to the notch member 284, the notch 286 receiving a detent, not shown, projecting downwardly from the bifurcated end of the handle 282. By lowering the outer end of the handle 282, the detent is raised out of the notch 286 so as to permit the shaft 278 and the pinion 276 to be actuated, to thereby move the bracket 236 to the right or to the left, as viewed in FIGURE 14. Thus, various portions of the cutting edge may be upset as desired. A compression spring 290, mounted upon a rod 292 and its lower end supported in a pair of links 285 attached to the shaft 278, urges the handle 282 in a clockwise direction, as viewed in FIGURE 14, to bias the detent into the notch 288. When the handle 282 is locked by the detent, not shown, the two hammers cannot move in unison away from dead center.

As may best be seen by referring to FIGURE 14, a mechanism has been shown for centering the hammers when actuated in unison either to the left or to the right. This has been accomplished by urging the detent, not shown, into the notch 286. The centering mechanism includes member 294 that has a longitudinally extending slot, horizontally disposed, through which a bolt 298 fixedly attached to the rack 274 projects. When bracket 236 is seated so that the main body thereof is parallel to the toothed rack 274, the hammers are aligned with the longitudinal axis of the drill 90. At the same time, the bracket member 212 and the shaft 214 are held in the position shown in FIGURE 8 by the spring 225a. This position may be referred to as a normal home position for the hammers. As described above, the hammers may be moved in opposite directions from the center position shown in FIGURE 8. However, as soon as the handle 224 is released, the spring 225a actuates the cable 223a, so as to rotate the shaft 221 to move the hammers into close contact with each other and aligned with the center line of the drill 90. The compression spring 225a will continue to hold the hammers in close proximity to each other. The hammers are held in parallel relation as shown in FIGURE 8 by member 212 remaining in the position shown in FIGURE 8. The bracket 236 pivotally mounted upon the shaft 221, upon being actuated to the right or to the left, will swing the supports for the hammers (held in parallel relation) in unison about the pivotal mounting of the bracket 236 upon the shaft 221. The supports for the hammers are then held in parallel relation to each other, so that the hammers swing to the left or to the right with the movements of the hammers then being parallel to each other. The deflected ends 294a and 294b form an angle with respect to the main body portion of member 294. A shoe member 296 has an aperture through which the bolt 298 projects. This shoe member 296 is provided with a deflected end 296a and another deflected end 296b nested against the deflected ends 294a and 294b of member 294 when the hammers are centered. When the hammers 140 are shifted to the right or to the left by actuating the handle 282, as explained above, shoe member 296 is moved to the right or to the left, as viewed in FIGURE 14, causing the inclined end or deflected end of shoe member 296 to glide outwardly either on the deflected end 294a or the deflected end 294b as clearly shown in FIGURE 18. When this takes place, as clearly shown in FIGURE 18, shoe member 296 is cocked, so to speak, with respect to member 294 and the compressed spring 290 will then exert a pressure against shoe member 296, so as to cause it to move into contact with member 294, thereby centering the hammers.

When a drill has been mounted in position and the hammers 140 are driven, these hammers will upset the end of the drill so as to form a V-shaped cutting edge. In the event one portion of the cutting edge projects beyond the balance of the cutting edge, it is necessary to upset this portion to a greater extent than the other portions. If the cutting edge is uniformly dull, it is merely necessary to swing the hammers laterally, one swinging to the right and the other swinging to the left in order to sharpen the entire edge. In the event one portion of the drill as, for example, on the left hand side, projects outwardly from the cutting edge of the balance of the drill, it is then necessary to shift both hammers in unison towards the projecting portion so as to upset enough metal to provide a straight V-shaped cutting edge across the entire drill.

In order to control the flow of the metal as it is being upset, a die member, not shown, is slipped over the small end of the bit before the bit is sharpened. This die member is seated against the bevelled surfaces 260 of the drill to confine the flow of metal as it is being upset into predetermined areas.

After the V-shaped edge 90a has been formed and the die member, not shown, is removed, it is necessary to shape the bevelled edges or surfaces 260 on the portion of the drill that has been upset, which portions are adjacent the cutting edge. This may be accomplished by use of one hammer operating on one margin at a time. In the embodiment disclosed in the drawings a pair of hammers has been shown. This includes a pair of diametrically disposed pneumatic hammers 300. These hammers are mounted upon carriages 302. These carriages are mounted upon a circular track sector 304. The ends of the sector 304 are mounted upon blocks 306 supported upon frame member 308 connected to vertically adjustable links 310 and 312. These link members are used in raising the track sector 304, so that the radius of curvature of the sector 304 terminates in a point coaxial with the longitudinal axis of the drill. Any relative movement between the support for the drill and the arcuate track 304 may be used to make the proper alignment.

Each of the carriages 302 has pivotally mounted thereon a frame member 320, each provided with an arm 322. These frame members 320 are mounted upon vertical pivots when the hammers are horizontally disposed, as clearly shown in FIGURE 1. The angular position of the pneumatic hammers 300 may be adjusted by an adjusting mechanism that will now be described.

Adjustable means are provided so that by rotating the rod 330 having right handed threads 330R and left handed threads 330L by means of a hand wheel 440, the angular position of the hammers may be adjusted so as to extend normal to the underlying bevelled surface 260 of the bit. The adjustable means for changing the angle of the hammers 300 includes the transverse rod 330 having right hand threads 330R near one end and left hand threads 330L toward the other end. This rod 330 is rotatably mounted in a sleeve 332, which sleeve prevents endwise movement of the rod 330. The sleeve 332 is attached to an arm 334 fixedly mounted on an arm 335 fixedly mounted on one of the frame members 320. Thus, it can readily be seen that the rotation of the hand wheel 440 attached to a shaft 341 coupled to a coupling unit 343 on the end of the transverse rod 330 adjusts the angle of the pneumatic hammers in unison.

The two carriages 302 are provided with guiding wheels 340 for holding the carriages in contact with the track 304. A pair of links 342 are attached to a sub-frame 344 engaging the track and causing the two carriages 302 to be diametrically disposed at all times. However, the carriages 302 may be rotated with respect to the drill, so that when the hammers are pneumatically driven, the bevelled surface 260 may be formed into frustum-conical segments. In forming these frustum segments 260, a certain amount of metal will flow so as to distort the margins of the V-shaped cutting surface of the bit. This distortion of the cutting surface may be removed by a grinder, in that it represents excess metal. After being removed, the bit is provided with a V-shaped cutting edge subtended by substantially bevelled segments of a frustum-conical surface.

As best seen by referring to FIGURE 13, the drill 90 is provided with grooves 94 in each side of the drill. These grooves provide a passageway for the liquid medium, such as water, used to carry away the granular material resulting from the drilling operation. It is necessary to keep these grooves open to the cutting edge. In upsetting and sharpening the V-shaped cutting edge by the hammers 140, there is a tendency to fill the lower end of the groove 94 by the upset metal as only shown in FIGURE 13, this is taken care of by a pair of punches 402 and 404. This is taken care of by a pair of punches 402 and 404 mounted on a pin 406 seated in an aperture therefor in frame member 408. Member 408 is mounted on top of frame member 410, shown in FIGURE 13. Member 410, as best seen in FIGURE 1, is pivotally supported upon two pairs of pivotally mounted links 420 and 422. These links are so constructed and arranged that when a cylinder 428 is supplied with hydraulic fluid, the piston rod 430 raises the frame member 410 from the position shown in FIGURE 1 into the position shown in FIGURE 13, where the punches 402 and 404 are aligned with the end of the groove 94. In order to provide room for the punches 402 and 404 and the parts associated therewith between the ends of the hammers 140 and the drill 90, it is necessary to move the drill away from the hammers a sufficient distance. By the use of the hammers 140, the punches 402 and 404 are driven into the end of the groove 94, in that the metal, being hot, is easily severed. By this arrangement, the end of the groove 94 is opened. The drill 90 may then be removed and the surplus metal from the cutting edge is removed by a grinder.

Referring to the modification disclosed in FIGURES 15 and 16, two identical units 350 are mounted upon the channel members 28. These units are provided with a carriage 352 provided with rollers 354 traveling on the lower flanges of channel members 28. The longitudinally extending channel member 356 extends throughout the length of each carriage and overlaps the flanges of the channel members 28, as best seen in FIGURE 15. The housing member 360 is provided with a pair of ratchet members 362 and 364 provided with gear teeth meshing with the pinion 366, keyed to a shaft 368 having attached thereto an arm 370 actuated by a piston rod, not shown, mounted in the cylinder 372 shown in FIGURE 15. The arrangement of the drive mechanism for the pinion 366 is substantially identical to the drive mechanism for the pinion 108 shown in FIGURE 6. The ratchet members 362 and 364 are provided with pins 376 and 378 engaging opposite sides of the drill member 90 in a manner similar to that disclosed in the preferred embodiment shown in FIGURE 6.

In the modification disclosed in FIGURES 15 and 16, a vertically extended housing member 380 is used. This housing member also has a cavity supporting vertically extended ratchet members 382 and 384. The gear teeth on the ratchet members 382 and 384 engage the teeth of a pivotally mounted pinion member 386. The ratchet member 384 is attached to a piston rod 390 extending from a cylinder 392. This ratchet member 384 is provided with an outwardly projecting bracket 396 mounted for vertical movement in a slot 398 in the housing member 380. The ratchet member 382 is provided with a horizontally extending pin 400. From this it may be readily seen that the bracket member 396 engages the under side of the drill 90 and the cylinder 392 is supplied with hydraulic fluid or pneumatic pressure to actuate and lift the drill placed thereon upwardly until the pin 400 arrests the upward movement of the drill.

By this arrangement, it can be readily seen that by energizing the cylinders 372 and 392, the drill is automatically centered with respect to the hammers 140 and the pneumatic hammers 300. The two carriages 350 may be moved forward and aft, so as to be properly spaced to support the drill to be sharpened in the proper position for sharpening the cutting end of the drill when the opposite end thereof abuts a suitable tail stock member.

Due to the various lengths of the drills, it can readily be seen that it is necessary to provide adjustment for the carriages so as to support various lengths of drills.

The drill is moved from the forge or the furnace to be supported upon the carriage 30 that has been retracted to the aft position as shown in FIGURE 2. The sharpened end of the drill should be positioned so that when the indexing member 52 is in the proximity of the end to be sharpened, the drill, upon being advanced upon the carriage 30 by the cylinder 42 will then be in the proper position with respect to the hammers for sharpening the drill when the hammers are driven and actuated across the cutting edge either by actuating the handle 224 or the handle 282. The operator, in actuating the handle 224, actuates the hammers in opposite directions, that is, the one hammer moving toward the left end of the cutting edge and the other hammer moving toward the right end of the cutting edge and back again to the center position until the drill has been sharpened, unless the drill has not worn equally or a piece or pieces have been broken off of the end of the drill. In this event, the drills are held in parallel relation, but shifted rotatably by the operator actuating the handle 282 to the right or to the left, as shown in FIGURE 14.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A machine for sharpening a drill by upsetting the end thereof, said machine including adjustable means for supporting the drill, hammer means including a pair of reciprocatory hammers, cyclically operating means for driving the hammers, said last mentioned means including means for connecting the cams to the hammers so that the hammers are driven in opposite directions, one hammer being driven towards and against the end of the drill and the other hammer moving away from the drill during one-half cycle, the movement of the hammers being reversed during the second half of the cycle.

2. A machine for sharpening a drill according to claim 1, wherein controlled means are provided for gradually spreading the hammers so as to cover the entire cutting edge of the drill.

3. A machine for sharpening a drill according to claim 1, wherein means are provided for biasing the hammers into parallel relation with respect to each other and in close proximity to each other and wherein controlled means are provided for shifting the hammers in unison so as to upset and sharpen various portions of the drill.

4. A machine for sharpening a drill wherein the cutting end of the drill is subtended by frustum-conical bevelled surface sectors, said machine including means for supporting the drill, a circular track encircling the drill, a supporting carriage, a pair of pneumatic hammers adjustably mounted thereon, said hammers being diametrically disposed, and means for adjusting the angle of the hammers to shape the frustum-conical surface sectors.

5. A machine for sharpening a drill according to claim 4, wherein the means for adjusting the angular position of the pneumatic hammers includes a rotatably mounted bar, means for holding the bar against endwise movement, said bar beng provided with right hand threads on one end and left hand threads on the other end, and arms connected to the pneumatic hammers, one of said arms threadedly engaging the right hand threads and the other arm threadedly engaging the left hand threads so that as the bar is rotated the angles of the pneumatic hammers are adjusted in unison.

No references cited.

GRANVILLE Y. CUSTER, JR., *Primary Examiner.*